G. C. JENSEN.
LOCKING DEVICE FOR MOVABLE LEVERS.
APPLICATION FILED DEC. 18, 1916.
1,233,785.
Patented July 17, 1917.
2 SHEETS—SHEET 2.
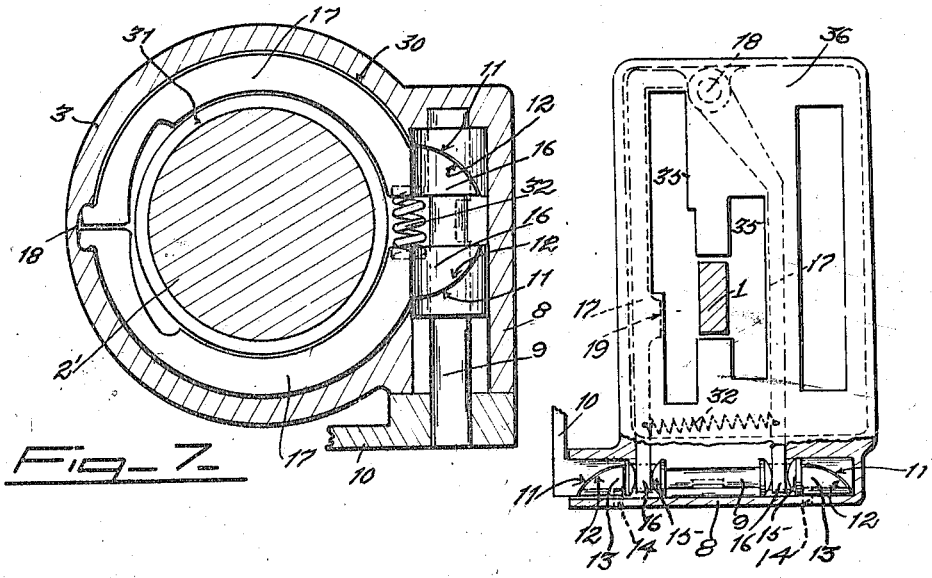
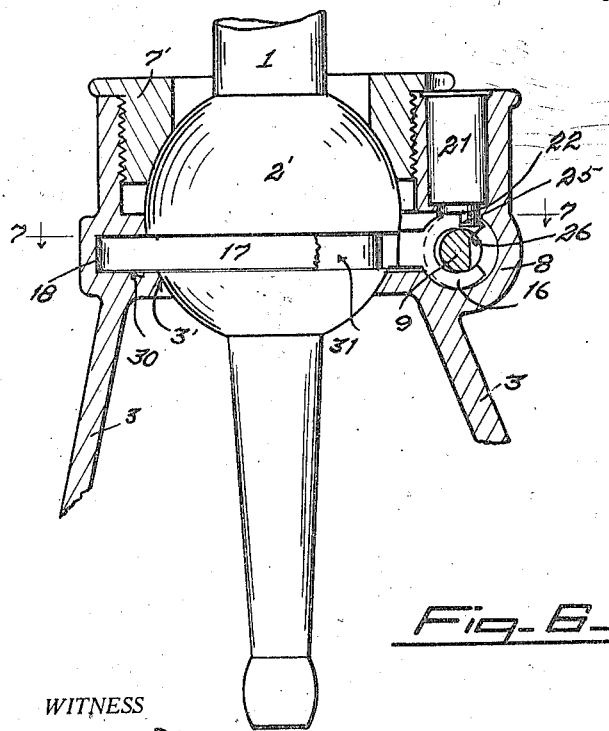
WITNESS
INVENTOR.
George C Jensen
BY
ATTORNEYS

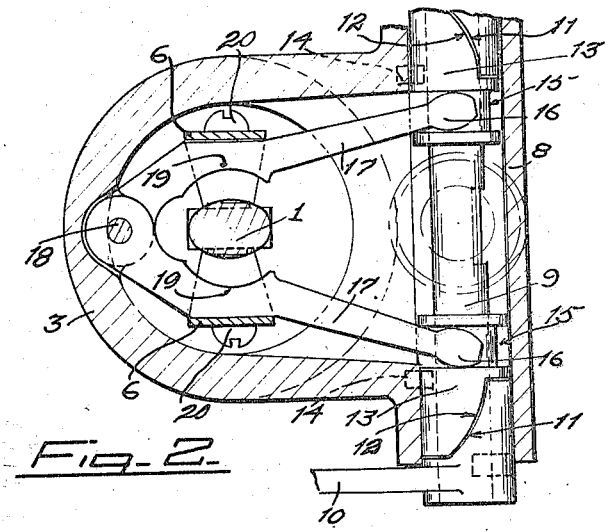
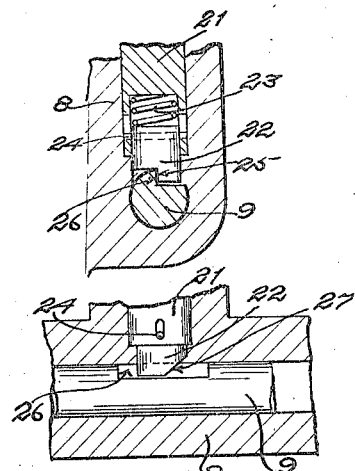
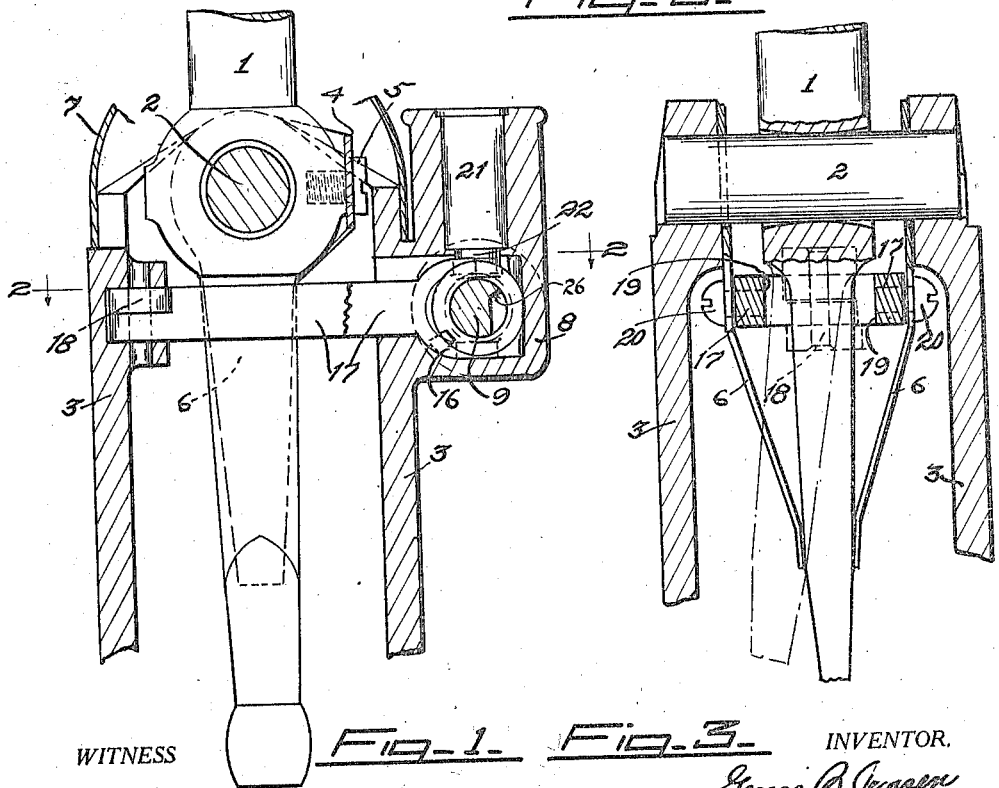

UNITED STATES PATENT OFFICE.

GEORGE C. JENSEN, OF OAKLAND, CALIFORNIA.

LOCKING DEVICE FOR MOVABLE LEVERS.

1,233,785.  Specification of Letters Patent.  Patented July 17, 1917.

Application filed December 18, 1916. Serial No. 137,515.

*To all whom it may concern:*

Be it known that I, GEORGE C. JENSEN, a citizen of the United States, residing at Oakland, in the county of Alameda and State of California, have invented certain new and useful Improvements in Locking Devices for Movable Levers, of which the following is a specification.

The present invention relates to means for locking movable levers to prevent operative movement thereof.

The object of the invention is to provide a device of the character described, which is particularly adaptable for use in connection with the control levers of a motor vehicle, for the purpose of locking said levers to prevent theft or unauthorized use of the vehicle. In the preferred form of the device herewith illustrated, I have shown it as applied to the usual gear-shifting lever of a motor vehicle, to lock said lever in its neutral position. By so doing, the gear-shifting lever cannot be operated to throw into mesh any of the power-transmitting gears of the vehicle, so that said vehicle, although capable of being moved about by hand or outside power, as, for example, in a garage or repair shop, cannot be operated under its own power, and therefore cannot be stolen or used by unauthorized persons.

More particularly, the present invention relates to a device for locking, in neutral position, motor vehicle gear-shifting levers of certain well known types. It is to be understood, however, that the device is also applicable to movable levers for other purposes, and that changes may be made in the form and construction of the device without departing from the spirit of the invention as expressed in the claims hereto appended.

In order to comprehend the invention, reference should be had to the accompanying drawings, wherein—

Figure 1 is a vertical section of a portion of a motor vehicle gear-shifting lever and the fulcrum support therefor, showing my locking device applied thereto.

Fig. 2 is a sectional plan view taken in the direction of the arrows on the line 2—2 of Fig. 1.

Fig. 3 is a vertical section of the same, taken in a plane perpendicular to the plane of Fig. 1.

Fig. 4 is a vertical sectional detail of the latch for retaining the locking member.

Fig. 5 is a vertical sectional detail of the same, taken in a plane perpendicular to the plane of Fig. 4.

Fig. 6 is a vertical section of a portion of another type of gear-shifting lever and the fulcrum support therefor, showing a modified form of my locking device applied thereto.

Fig. 7 is a sectional plan view taken in the direction of the arrows on the line 7—7 of Fig. 6.

Fig. 8 is a plan view of a second modified form of my locking device.

In the drawings, the reference numeral 1 designates a movable motor vehicle gear-shifting lever, whose upper end is understood to be provided with a suitable handle, not shown in the drawings. Said lever, as illustrated in Figs. 1 and 3 of the drawings, is fulcrumed upon a transverse pin 2, for operative swinging movement, and is also permitted to have a limited selective movement upon said pin 2, in a plane perpendicular to the planes of its operative movement. The pin 2 is carried in a support 3, which incloses the lower end of the lever 1 and is understood to form a part of the housing, not shown in the drawings, for the mechanism operated by said lever. A spring 4 is secured to the lever 1 at 5, and has two spaced arms 6, Figs. 1, 2 and 3, whose upper ends surround the pin 2 and bear against the sides of the support 3, and whose lower ends turn inwardly and bear against the lower end of the lever 1, the function of said spring being to retain the lever 1 in its neutral position; that is, at the center of its selective movement. A portion of a suitable articulated dust cover is shown at 7, Fig. 1, for inclosing the upper end of the support 3.

The support 3 is provided with an extension 8, Figs. 1 and 2 of the drawings, within which is carried a horizontal rotatable locking bolt 9, shown as positioned parallel with the fulcrum pin 2. One end of said bolt extends outside the extension 8, and is provided with a lever 10, Fig. 2, by means of which it may be rotated. Within its housing, said bolt is provided with spaced oppositely disposed face cams 11, which are adapted to coact with similar cams 12 formed upon trunnion blocks 13 slidable upon the bolt 9 and prevented from turning therewith by fixed pins 14 operating in lineal slots in said trunnion blocks. Said trunnion blocks are provided with annular grooves 15 within which ride the forked ends 16 of a pair of spaced locking arms 17, said arms being pivotally supported by the support 3 at 18, and provided with jaw portions 19 adapted to embrace the lever 1, below the fulcrum thereof, to lock the same against movement. Said locking arms are secured to the side spring members 6 by means of screws 20, Figs. 2 and 3, so that said springs tend to hold said arms apart, in which position the lever 1 is free to move either operatively or selectively. By rotating the bolt 9, however, the trunnions 13 are forced together, and the jaws 19 of the arms 17 are caused to embrace and lock the lever 1.

For retaining the bolt 9 in its locking position, there is provided a rotatable key controlled lock barrel of any suitable construction, indicated at 21 in Figs. 1, 4 and 5, mounted in the support extension 8 above the central portion of said bolt 9. In the lower end of the lock barrel 21 is carried a latch 22, which is adapted for limited lineal movement in said barrel, and pressed outwardly by a spring 23, Fig. 4, and caused to rotate within said barrel by a pin 24. The lower end of said latch 22 is formed with a transverse shoulder 25, adapted to engage a lineal shoulder 26, formed in the bolt 9, when said bolt is rotated to its locking position, and by such engagement to retain said bolt in said locking position. One corner of the lower end of the latch 22 is beveled, as at 27, Fig. 5, so that when the barrel 21 is turned, said latch will ride up over the shoulder 26 of the bolt 9 to release the same.

One movement only is necessary to either lock or unlock the lever 1. To lock said lever, the bolt 9 is turned by means of its operating lever 10, drawing together the arms 17. The latch 22 automatically falls into engagement with the shoulder 26 of said bolt, to hold the same in its locking position. The release of the lever 1 is accomplished by turning the lock barrel 21 by means of a key, not shown. This movement causes the latch 22 to disengage the bolt 9, whereupon the spring members 6 force the locking arms 17 apart, freeing the lever 1 and returning said bolt to its normal position.

In Figs. 6 and 7 of the drawings, I have shown my invention as applied to a lever having a ball and socket fulcrum, such levers being commonly employed as gear-shifting levers for motor vehicles. In this form of the device, the lever 1 is provided with a spherical fulcrum portion 2', which seats within a spherical socket 3' formed in the support 3, and is retained therein by a suitable ring 7', so that said lever may swing in any vertical plane. An annular horizontal groove 30 is formed in the spherical socket member 3', and a groove 31 is formed in the spherical lever portion 2' to register therewith when the lever is in its neutral position. The locking arms 17, which are movably secured to the support 3 at 18, normally lie within the groove 30 in the socket 3', and are so retained by a spring 32, Fig. 7. Said arms 17 are adapted to be moved together, to cause their inner portions to enter the groove 31 in the lever portion 2', to lock said lever against movement in any plane. For this purpose the forked ends 16 of said arms are formed directly with the cam faces 12, the trunnions 13 of the previously described form being dispensed with. Said cam faces 12 are engaged, as in said previously described form, by the face cams carried by the rotatable locking bolt 9. Said bolt is mounted, as before, in an extension 8 of the support 3, and is provided with an exterior operating lever 10 and locking means 21 and 22, similar in every respect with those described above and illustrated in Figs. 1, 2, 3, 4 and 5.

In this form of device, rotation of the locking bolt 9 causes the arms 17 to be moved inwardly to engage the slot 31 in the lever portion 2', and thereby to lock said lever against all movement. Release of the lever is accomplished, as before, by turning the lock barrel 21 to disengage the latch 22 from the bolt 9, whereupon the arms 17 are forced outwardly free from the groove 31, and said bolt returned to its normal position, by the spring 32.

Fig. 8 of the drawings illustrates a second modification of my invention, adapted for application to a lever working within an H-slotted guide.

In this form, the lever 1 is understood to be mounted in a way to permit its movement within the slots 35 of the guide plate 36, said lever and said guide plate being supported in any manner not illustrated. The plate 36 carries a bolt support 8, within which is a rotatable bolt 9 having an exterior operating lever 10, oppositely disposed face cams 11, and trunnions 13 having cam faces 12 adapted to coact with said cams 11, said trunnions being held against rotation by pins 14, and being provided with grooves 15 to receive the forked ends 16 of the locking arms 17, said bolt and associated parts being similar to those shown in Figs. 1, 2, 3, 4 and 5, and being understood to have a similar key controlled latch, not shown. The locking arms 17 are pivoted at 18, Fig. 8, and are formed as shown therein, to normally lie outside the path of movement of the lever 1. When the bolt 9 is turned, however, said arms 17 are brought toward each other, and clamp the lever 1 between them, in its neutral position. The release of the lever is accomplished as before, by releasing the bolt 9 by disengaging therefrom the key controlled latch, not shown, thereby permitting the spring 32 to separate the arms 17 and return the bolt 9 to its normal position.

Having thus described my invention, what I claim as new and deisre to protect by Letters Patent is:—

1. In combination with a movable lever having a substantially spherical fulcrum and an annular groove formed therein, a substantially spherical socket member for placing said lever, a pair of swinging arms adapted to embrace said lever and to seat in the groove in the spherical portion thereof and to prevent movement thereof and the removal of said lever from said socket, a rotatable member for moving said arms into engagement with said lever, lock controlled devices for retaining said member in operative position, and a spring for returning said arms and said member to inoperative position upon the release of said lock controlled devices.

2. In combination with a movable lever having a spherical fulcrum and an annular groove formed therein, a substantially spherical socket member for supporting said lever, a pair of movable arms carried within said socket member and adapted to engage with said annular groove to prevent movement of said lever, and means for operating said arms.

3. In combination with a movable lever, a pair of swinging arms adapted to embrace said lever, to prevent movement thereof, a trunnion block associated with the free end of each arm, a rotatable locking bolt coöperating with said trunnion blocks, said trunnion blocks and locking bolt provided with coöperating cam faces adapted on the rotation of said locking bolt to operative position to move the free ends of said arms relative to each other to prevent operative movement of the lever, said locking bolt provided intermediate said trunnion blocks with a recess, and lock controlled mechanism for automatically engaging directly with said recess on the rotation of said locking bolt to operative position.

In testimony whereof I have signed my name to this specification in the presence of two subscribing witnesses.

GEORGE C. JENSEN.

Witnesses:
 HARRY A. TOTTEN,
 D. B. RICHARDS.